(12) United States Patent
Yamada et al.

(10) Patent No.: US 11,804,978 B2
(45) Date of Patent: Oct. 31, 2023

(54) NETWORK HUB DEVICE

(71) Applicant: Mazda Motor Corporation, Hiroshima (JP)

(72) Inventors: Sadahisa Yamada, Hiroshima (JP); Yoshimasa Kurokawa, Hiroshima (JP); Tetsuhiro Yamashita, Hiroshima (JP); Masaaki Shimizu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/619,256

(22) PCT Filed: Jul. 10, 2020

(86) PCT No.: PCT/JP2020/027040
§ 371 (c)(1),
(2) Date: Dec. 15, 2021

(87) PCT Pub. No.: WO2021/010324
PCT Pub. Date: Jan. 21, 2021

(65) Prior Publication Data
US 2022/0417054 A1    Dec. 29, 2022

(30) Foreign Application Priority Data

Jul. 18, 2019  (JP) ................. 2019-132548

(51) Int. Cl.
*H04L 12/40* (2006.01)

(52) U.S. Cl.
CPC ............ *H04L 12/40006* (2013.01); *H04L 2012/40215* (2013.01); *H04L 2012/40273* (2013.01)

(58) Field of Classification Search
CPC ........ H04L 12/28; H04L 12/461; H04L 12/46
See application file for complete search history.

(56) References Cited

U.S. PATENT DOCUMENTS 5,483,230 A  *  1/1996  Mueller ................. H03K 17/94
                                                    340/3.1
9,387,813 B1 *  7/2016  Moeller .................... B60R 1/00
(Continued)

FOREIGN PATENT DOCUMENTS

EP      2636204 A2    9/2013
JP      2006-28936 A  2/2006
(Continued)

OTHER PUBLICATIONS

International Search Report and Written Opinion dated Aug. 25, 2020, received for PCT Application PCT/JP2020/027040, Filed on Jul. 10, 2020, 8 pages including English Translation.

*Primary Examiner* — Steven G Snyder
*Assistant Examiner* — Christopher A Daley
(74) *Attorney, Agent, or Firm* — XSENSUS LLP

(57) ABSTRACT

A network hub device used for building a simple network configuration in an in-vehicle network system is provided. A network hub device (35) is coupled to a trunk network and performs input/output of a signal to/from an in-vehicle device via a plurality of device side communication ports. A signal conversion section (35a, 35b) configured to perform signal conversion between a digital control signal and an analog control signal is provided between a trunk side communication port and an analog port. A second signal conversion section (70) configured to perform signal conversion between a digital control signal and an analog control signal is provided between a digital port (49) and a predetermined in-vehicle device (353).

4 Claims, 5 Drawing Sheets

(56) References Cited

U.S. PATENT DOCUMENTS

| | | | |
|---|---|---|---|
| 10,015,304 B2* | 7/2018 | Lee | H04M 1/72415 |
| 10,382,694 B2* | 8/2019 | Hasegawa | G09G 5/14 |
| 10,504,302 B1* | 12/2019 | Chavez | H04W 4/90 |
| 10,721,101 B1* | 7/2020 | Langner | H01B 11/005 |
| 2010/0087981 A1* | 4/2010 | Orozco-Perez | H04L 67/52 |
| | | | 701/29.5 |
| 2017/0116800 A1* | 4/2017 | Lin | B60R 25/24 |
| 2017/0163474 A1 | 6/2017 | Schoonmaker et al. | |
| 2018/0043748 A1 | 2/2018 | Kuribayashi | |
| 2019/0058611 A1 | 2/2019 | Maeda et al. | |
| 2019/0372803 A1* | 12/2019 | Bölter | H04L 12/40039 |
| 2020/0204396 A1 | 6/2020 | Kobayashi | |
| 2020/0284876 A1* | 9/2020 | Hurd | G01S 7/415 |
| 2021/0184886 A1 | 6/2021 | Maeda et al. | |

FOREIGN PATENT DOCUMENTS

| | | |
|---|---|---|
| JP | 2006-270878 A | 10/2006 |
| JP | 2016-168967 A | 9/2016 |
| JP | 2017-210182 A | 11/2017 |
| JP | 2017-212725 A | 11/2017 |
| JP | 2018-195952 A | 12/2018 |

\* cited by examiner

NETWORK HUB DEVICE

CROSS-REFERENCE TO RELATED APPLICATIONS

The present application is based on PCT filing PCT/JP2020/027040, filed Jul. 10, 2020, which claims priority to JP 2019-132548, filed Jul. 18, 2019, the entire contents of each are incorporated herein by reference.

TECHNICAL FIELD

A technology disclosed herein relates to a network hub device used for transmitting information in an in-vehicle network system.

BACKGROUND ART

PATENT DOCUMENT 1 discloses a network hub (HUB) configured to, in an in-vehicle network system including a first network, such as Ethernet (registered trademark) or the like, and a second network, such as a controller area network (CAN) or the like, appropriately define a transmission path of a message transmitted from an electronic control unit coupled to the first network. PATENT DOCUMENT 2 discloses an actuator control system that can drive door actuators of different types by one communication massage in a communicated system.

CITATION LIST

Patent Document

PATENT DOCUMENT 1: Japanese Unexamined Patent Publication No. 2017-212725
PATENT DOCUMENT 2: Japanese Unexamined Patent Publication No. 2016-168967

SUMMARY OF THE INVENTION

Technical Problem

Recently, the development of automatic driving systems has been promoted nationally. In an automatic driving system, in general, environment information outside a vehicle is acquired by a camera or the like and an arithmetic device calculates a route in which the vehicle should travel, based on the acquired environment information outside the vehicle. Based on a result of this calculation, various types of actuators mounted on the vehicle are controlled. Sensor signals are input to the arithmetic device from various types of sensors mounted on the vehicle.

It is expected that a control function of each actuator is incorporated in a vehicle travel control device including an arithmetic device in the future. In such a configuration, in order to transmit information between the vehicle travel control device and each actuator, it is required to build a simple network configuration that does not require many interconnects. Types and the number of in-vehicle devices, such as an actuator, a sensor, or the like, installed in the vehicle vary depending on differences in vehicle model and grade. In an in-vehicle network system, a device capable of absorbing differences in types and the number of the in-vehicle devices is required. Such devices are useful not only in automatic driving systems but also in current drive assist systems or the like.

In view of the foregoing, a technology disclosed herein has been devised and it is therefore an object of the present disclosure to provide a network hub device used for building a simple network configuration in an in-vehicle network system.

Solution to the Problem

In order to solve the above-described problem, according to the technology disclosed herein, a network hub device used in an in-vehicle network system includes a trunk side communication port configured to couple to a trunk network through which a digital control signal of a predetermined first protocol is transmitted, a plurality of device side communication ports serving as communication ports each performing input/output of a signal to/from an in-vehicle device and including a first digital port configured to perform input/output of the digital control signal and a first analog port configured to perform input/output of an analog control signal, a signal conversion section provided between the trunk side communication port and the first analog port and configured to perform signal conversion between the digital control signal of the first protocol and the analog control signal input/output by the first analog port, and a second signal conversion section provided between the first digital port and a predetermined in-vehicle device and configured to perform signal conversion between the digital control signal input/output by the first digital port and the analog control signal input/output by the predetermined in-vehicle device.

According to this configuration, the network hub device is coupled to the trunk network through which the digital control signal of the first protocol is transmitted via the trunk side communication port and performs input/output of signals to/from in-vehicle devices via the plurality of device side communication ports. The plurality of device side communication ports include the first digital port configured to perform input/output of the digital control signal and the first analog port configured to perform input/output of the analog control signal. The signal conversion section configured to preform signal conversion between the digital control signal of the first protocol and the analog control signal is provided between the trunk side communication port and the first analog port. Moreover, the second signal conversion section configured to perform signal conversion between the digital control signal and the analog control signal is provided between the first digital port and the predetermined in-vehicle device. Thus, the second signal conversion section can be arranged close to the predetermined in-vehicle device, and therefore, a hard wire between the second signal conversion section and the predetermined in-vehicle device can be reduced in length or omitted.

The second signal conversion section may be formed with a circuit substrate of the predetermined in-vehicle device as one unit.

Thus, the hard wire between the second signal conversion section and the predetermined in-vehicle device can be omitted.

The predetermined in-vehicle device may be switches related to a door, and the network hub device may be provided in a side door.

Note that the term "protocol" used herein referred to as a so-called communication protocol, that is, "protocol" means a procedure for transmission/reception in communication or rules for communication.

Advantages of the Invention

According to the technology disclosed herein, an in-vehicle network system having a simple configuration can be built in a simple manner.

DESCRIPTION OF EMBODIMENTS

An exemplary embodiment will be described in detail below with reference to the accompanying drawings. Note that, herein, devices, such as a sensor, an actuator, or the like that are mounted on a vehicle and perform travel control will be referred to as in-vehicle devices or merely as devices.

Figure 1:
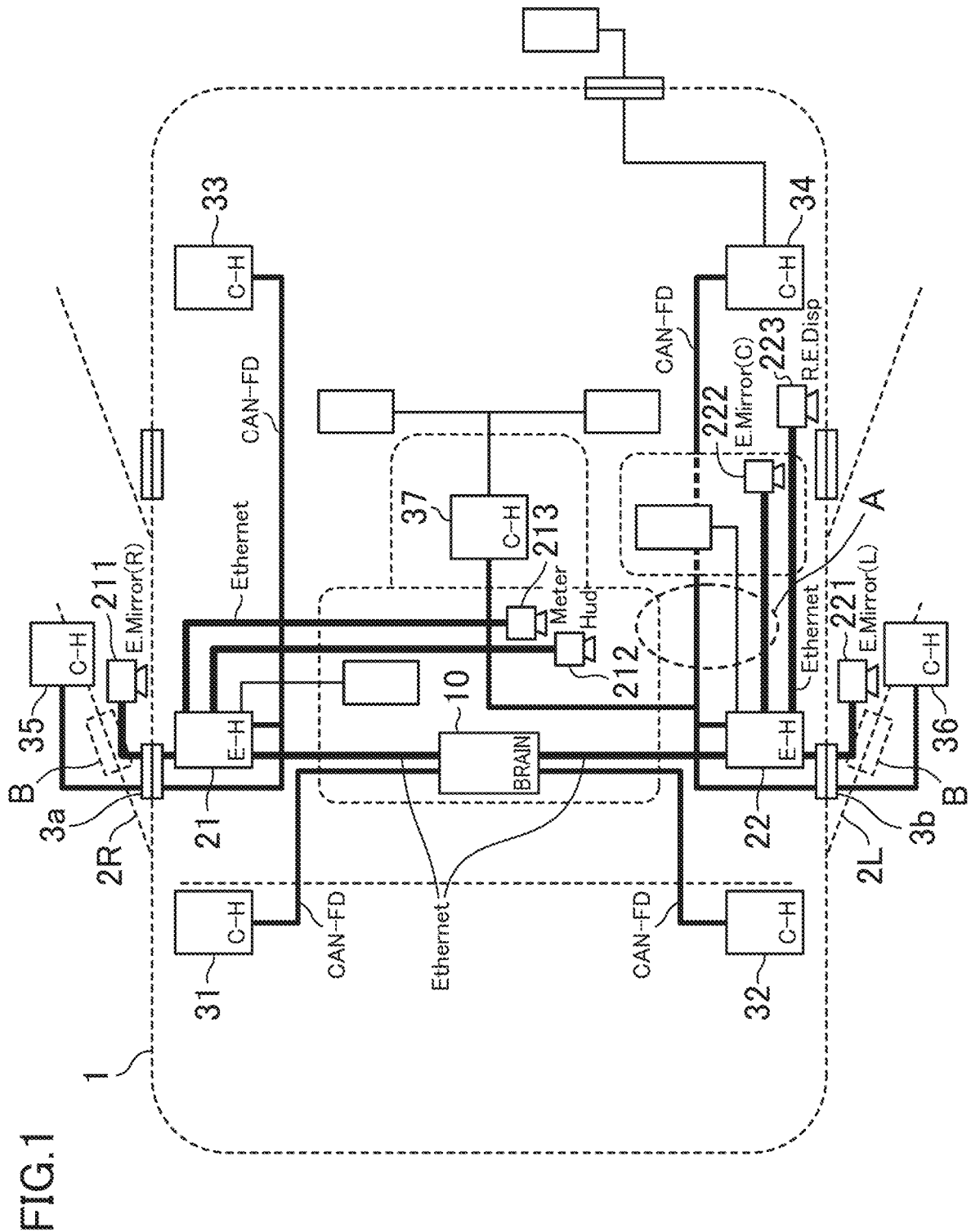
FIG. 1 is a diagram illustrating an example of a configuration of an in-vehicle network system.

FIG. 1 is a diagram illustrating an example of a configuration of an in-vehicle network system. The in-vehicle network system of FIG. 1 is mounted on a vehicle 1 and includes a central processing unit 10, Ethernet hub devices 21 and 22 (denoted by the reference sign E-H in FIG. 1) configured to transmit/receive Ethernet signals, and CAN hub devices 31, 32, 33, 34, 35, 36, and 37 (denoted by the reference sign C-H in FIG. 1) configured to transmit/receive controller area network (CAN) signals or CAN with flexible data rate (CAN-FD) signals.

In this embodiment, signal transmission paths between the central processing unit 10 and each of the Ethernet hub devices 21 and 22 and between the central processing unit 10 and each of the CAN hub devices 31, 32, 33, 34, 35, 36, and 37 will be referred to as "trunk networks." Signal transmission path from each of the Ethernet hub devices 21 and 22 to a corresponding in-vehicle device and each of the CAN hub devices 31, 32, 33, 34, 35, 36, and 37 to a corresponding in-vehicle device will be referred to as "device side networks." In FIG. 1, a transmission path of an Ethernet signal is indicated by a thick solid line, a transmission path of a CAN signal or a CAN-FD signal is indicated by a medium-thick solid line, and a signal path to an in-vehicle device is indicated by a thin solid line. Note that, in FIG. 1, details of the device side network are not illustrated.

Herein, a device having a function to relay information transmitted via a network will be referred to as a "network hub device." The Ethernet hub devices 21 and 22 and the CAN hub devices 31, 32, 33, 34, 35, 36, and 37 are examples of the network hub device according to this embodiment. The network hub device will be also occasionally referred to as an "information outlet device."

In order to enable automatic driving or assist driving of the vehicle 1, the central processing unit 10 calculates a route in which the vehicle 1 should travel and determines a motion of the vehicle 1 to follow the route in response to outputs of sensors or the like mounted on the vehicle 1 or the like. The central processing unit 10 is, for example, a processor formed of one or more chips and, in some cases, has an artificial intelligence (AI) function. The sensors or the like that output information to the central processing unit 10 include, for example, a camera used for shooting an external environment of the vehicle, a radar detecting an object or the like outside the vehicle, a global positioning system (GPS) sensor detecting a position of the vehicle, a vehicle state sensor detecting a behavior of the vehicle, such as vehicle speed, acceleration, a yaw rate, or the like, an occupant state sensor, such as an in-vehicle camera or the like, acquiring a state of an occupant of the vehicle, or the like. Communication information from another vehicle located around the vehicle and traffic information from a navigation system may be input to the central processing unit 10.

The Ethernet hub devices 21 and 22 are provided in a position (referred to as a dash zone) in front of front seats so as to be located in a passenger seat side and a driver's seat side, respectively. The Ethernet hub device 21 transmits/receives Ethernet signals to/from the central processing unit 10 via a trunk network. The Ethernet signals transmitted from the central processing unit 10 to the Ethernet hub device 21 include an image signal that causes each of an electronic mirror device 211, a head up display (HUD) device 212, and a meter display device 213 to display an image. The Ethernet hub device 21 transmits the image signal included in the Ethernet signals transmitted from the central processing unit 10 to each of the electronic mirror device 211, the HUD device 212, and the meter display device 213 to cause each of the devices to display the image. The Ethernet hub device 21 protocol-converts some of control signals included in the Ethernet signals transmitted from the central processing unit 10 to CAN-FD signals and transmits the CAN-FD signals to the CAN hub devices 33 and 35.

The Ethernet hub device 22 transmits/receives Ethernet signals to/from the central processing unit 10 via a trunk network. The Ethernet signals transmitted from the central processing unit 10 to the Ethernet hub device 22 include an image signal that causes each of the electronic mirror devices 221 and 222 and a display device 223 to display an image. The Ethernet hub device 22 transmits the image signal included in the Ethernet signals transmitted from the central processing unit 10 to each of the electronic mirror devices 221 and 222 and the display device 223 to cause each of the devices to display the image. The Ethernet hub device 22 protocol-converts some of the control signals included in the Ethernet signals transmitted from the central processing unit 10 to CAN-FD signals and transmits the CAN-FD signals to the CAN hub devices 34 and 36.

The CAN hub devices 31 and 32 are provided in an engine room (referred to as an engine zone) in a front portion of the vehicle so as to be located in a right side and a left side, respectively. The CAN hub devices 31 and 32 transmit/receive CAN-FD signals to/from the central processing unit 10 via trunk networks. The CAN-FD signals transmitted from the central processing unit 10 to the CAN hub devices 31 and 32 include a control signal for an engine or the like. The CAN hub devices 31 and 32 output control signals included in the CAN-FD signals transmitted from the central processing unit 10 as they are, perform data length conversion on the control signals to output CAN signals, perform protocol conversion on the control signals to output local interconnect network (LIN) signals, or perform signal conversion on the control signals to output analog control signals. The CAN hub devices 31 and 32 receive CAN signals, CAN-FD signals, LIN signals, and analog control signals from the corresponding in-vehicle devices, convert these signals to CAN-FD signals, and transmit the CAN-FD signals to the central processing unit 10.

The CAN hub device 33 and 34 are provided in a rear portion (referred to as a "rear zone") of the vehicle so as to be located in a right side and a left side, respectively. The CAN hub device 33 transmits/receives CAN-FD signals to/from the Ethernet hub device 21 via a trunk network. The CAN hub device 34 transmits/receives CAN-FD signals to/from the Ethernet hub device 22 via a trunk network. The CAN hub devices 33 and 34 output control signals included in the CAN-FD signals transmitted from the Ethernet hub devices 21 and 22 as they are, perform data length conversion on the control signals to output CAN signals, perform protocol conversion on the control signals to output LIN signals, or perform signal conversion on the control signals to output analog control signals. The CAN hub devices 33 and 34 receive CAN signals, CAN-FD signals, LIN signals, and analog control signals from the corresponding in-vehicle devices, convert these signals to CAN-FD signals, and transmit the CAN-FD signals to the Ethernet hub devices 21 and 22.

The CAN hub devices 35 and 36 are provided in a right side door 2R and a left side door 2L (referred to as a "door zone") of the vehicle 1, respectively. Note that the reference signs 3a and 3b denote so-called door through holes each being formed such that a harness is inserted in a door body from a vehicle body in a waterproof manner. The CAN hub device 35 transmits/receives CAN signals to/from the Ethernet hub device 21 via a trunk network. The CAN hub device 36 transmits/receives CAN signals to/from the Ethernet hub device 22 via a trunk network. The CAN hub devices 35 and 36 output control signals included in the CAN-FD signals transmitted from the Ethernet hub devices 21 and 22 as they are, perform protocol conversion on the control signals to output LIN signals, or perform signal conversion on the control signals to output analog control signals. The CAN hub devices 35 and 36 receive CAN signals, LIN signals, and analog control signals from the in-vehicle device, convert these signals to CAN signals, and transmit the CAN signals to the Ethernet hub devices 21 and 22.

The CAN hub device 37 is provided in periphery of a center console (referred to as a "console zone") of the vehicle 1. The CAN hub device 37 transmits/receives CAN-FD signals to/from the Ethernet hub device 22 via a trunk network. The CAN hub device 37 outputs control signals included in the CAN-FD signals transmitted from the Ethernet hub device 22 as they are, performs data length conversion on the control signals to output CAN signals, performs protocol conversion on the control signals to output LIN signals, or performs signal conversion on the control signals to output analog control signals. The CAN hub device 37 receives CAN signals, CAN-FD signals, LIN signals, and analog control signals from the corresponding in-vehicle devices, converts them to CAN-FD signals, and transmits the CAN-FD signals to the Ethernet hub device 22.

<Input/Output Configuration of Network Hub Device>

Figure 2:
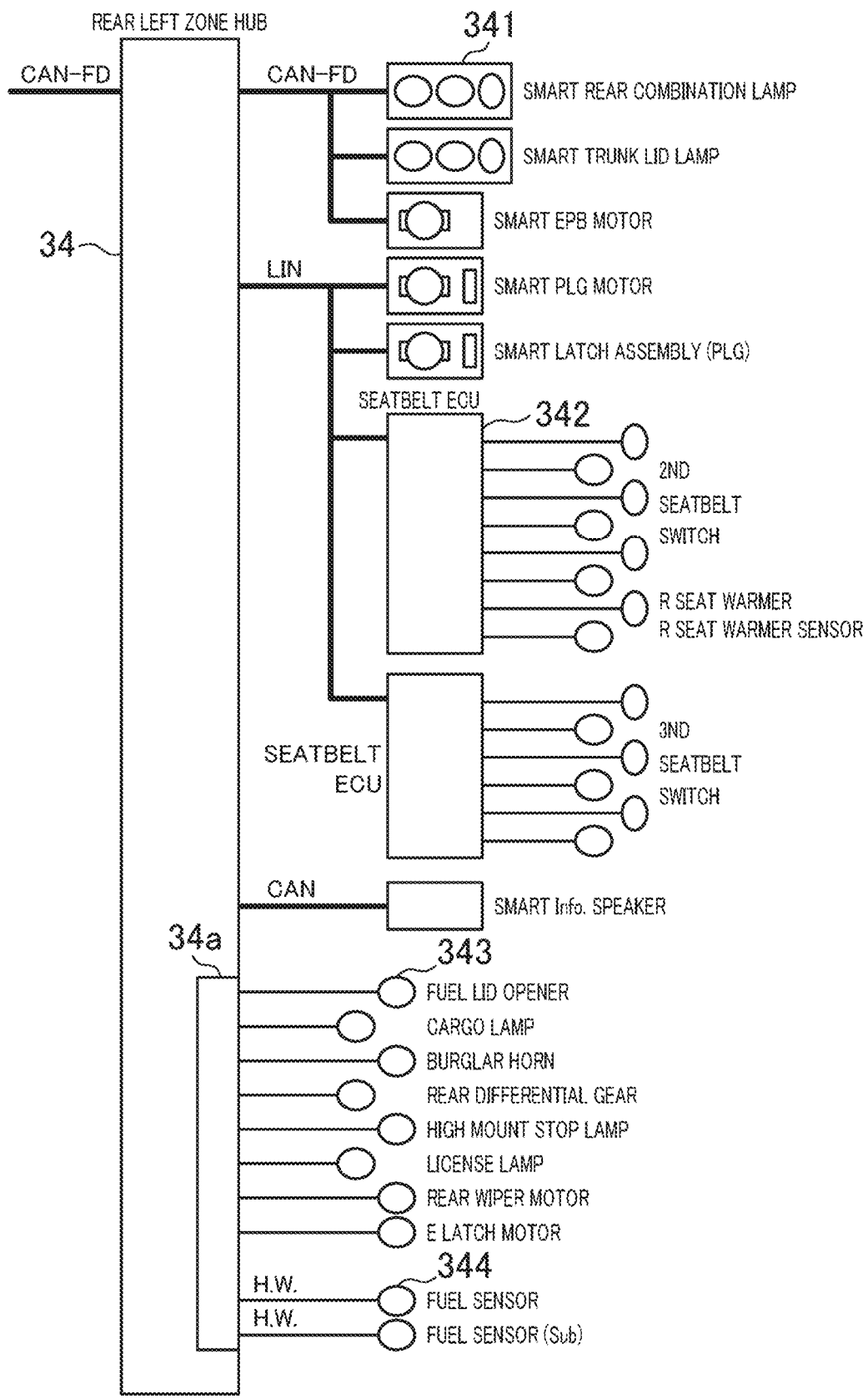
FIG. 2 is a diagram illustrating an example of an input/output configuration of a network hub device.

FIG. 2 illustrates an input/output configuration of the CAN hub device 34 arranged in the left side in the rear zone as an example of an input/output configuration of the network hub device. As illustrated in FIG. 2, specifically, for example, the CAN hub device 34 outputs a control signal included in transmitted CAN-FD signals as it is to a smart rear combination lamp 341 or the like. The smart rear combination lamp 341 includes a CAN controller built therein, extracts control data from the transmitted CAN-FD signal, and executes control of a lamp. The CAN hub device 34 protocol-converts a control signal included in the transmitted CAN-FD signals to a LIN signal and outputs the LIN signal to a seatbelt electronic control unit (ECU) 342 or the like. The seatbelt ECU 342 includes a LIN controller and an analog input/output circuit built therein, extracts control data from the transmitted LIN signal, converts the control data to an analog control signal, and executes control of a seatbelt. The seatbelt ECU 342 receives an output of a switch or a sensor provided to the seatbelt, converts the output to a LIN signal, and transmits the LIN signal to the CAN hub device 34. The CAN hub device 34 protocol-converts the LIN signal received from the seatbelt ECU 342 to a CAN-FD signal and transmits the CAN-FD signal to the trunk network.

The CAN hub device 34 includes a signal conversion section 34a. The signal conversion section 34a convers the control signal included in the CAN-FD signals transmitted to the CAN hub device 34 to an analog control signal and outputs the analog control signal to a fuel lid opener 343 or the like. The signal conversion section 34a receives an output of a fuel sensor 344 or the like and converts the output to a CAN-FD signal. The converted CAN-FD signal is transmitted to the trunk network.

<Function Configuration of Network Hub Device>

Figure 3:
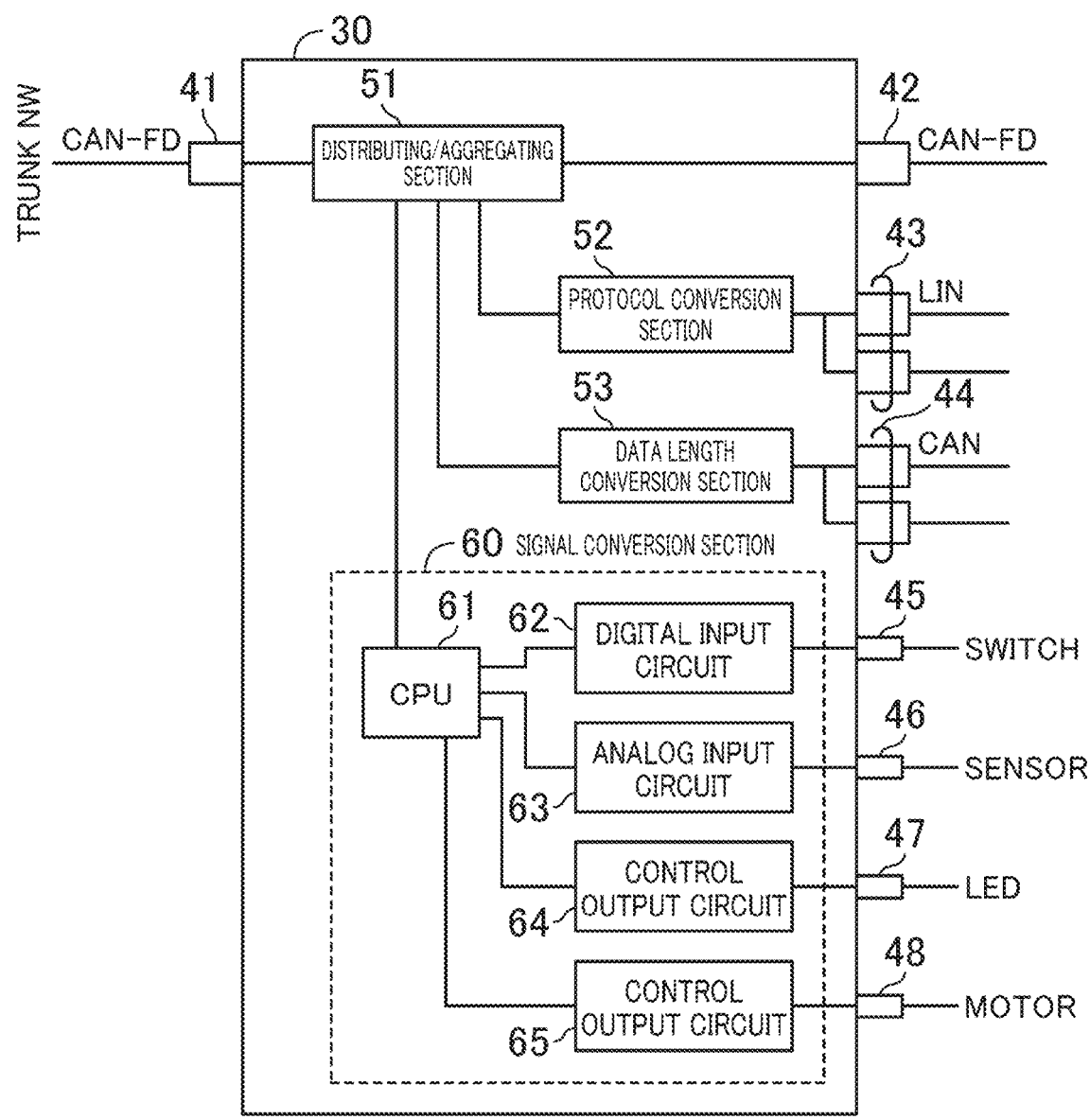
FIG. 3 is a diagram illustrating an example of a function configuration of the network hub device.

FIG. 3 is a diagram illustrating an example of a function configuration of a network hub device. A network hub device 30 of FIG. 3 corresponds to, for example, the CAN hub device 34 illustrated in FIG. 2, and in FIG. 3, a major function is illustrated. In this case, a CAN-FD signal is an example of a digital control signal of a predetermined first protocol and a LIN signal is an example of a digital control signal of a second protocol that is different from the first protocol.

The network hub device 30 incudes a trunk side communication port 41 as a communication port coupled to a trunk network and communication ports 42 to 48 as communication ports coupled to device side networks. The trunk side communication port 41 performs input/output of the CAN-FD signal. The communication port 42 performs input/output of the CAN-FD signal. The communication port 43 performs input/output of the LIN signal. The communication port 44 performs input/output of the CAN signal. Each of the communication ports 45 and 46 performs input of an analog control signal and each of the communication ports 47 and 48 performs output of an analog control signal. The communication port 42 corresponds to a first digital port, the communication port 43 corresponds to a second digital port, and each of the communication ports 45 to 48 corresponds to a first analog port.

The network hub device 30 includes a distributing/aggregating section 51, a protocol conversion section 52, a data length conversion section 53, and a signal conversion section 60. The distributing/aggregating section 51 distributes CAN-FD signals received from the trunk network via the communication port 41 as original signals of various types of output signals. One of the distributed CAN-FD signals is sent to the communication port 42 as it is. The other ones of the distributed CAN-FD signals are sent to the protocol conversion section 52, the data length conversion section 53, and the signal conversion section 60. The distributing/aggregating section 51 aggregates CAN-FD signals received from the device side network via the communication port 42 and CAN-FD signals sent from the protocol conversion section 52, the data length conversion section 53, and the signal conversion section 60 and sends aggregated signals to the communication port 41.

The protocol conversion section 52 performs protocol conversion on a CAN-FD signal sent from the distributing/aggregating section 51 to generate a LIN signal and sends the LIN signal to the communication port 43. The protocol conversion section 52 also performs protocol conversion on a LIN signal received from the device side network via the communication port 43 to generate a CAN-FD signal and sends the CAN-FD signal to the distributing/aggregating section 51.

The data length conversion section 53 performs data length conversion on the CAN-FD signal sent from the distributing/aggregating section 51 to generate a CAN signal and sends the CAN signal to the communication port 44. The CAN signal is 8 bytes and the CAN-FD signal is 64 bytes at most, and therefore, in this data length conversion, processing in which 64-byte data is divided into eight 8-byte data is performed. The data length conversion section 53 performs data length conversion on the CAN signal received from the device side network via the communication port 44 to generate a CAN-FD signal and sends the CAN-FD signal to the distributing/aggregating section 51. In this data length conversion, processing in which eight 8-byte data are put back together into 64 byte-data is performed.

The signal conversion section 60 generates analog control signals that control in-vehicle devices, based on the CAN-FD signal sent from the distributing/aggregating section 51, and sends the analog control signals to the communication ports 47 and 48. The signal conversion section 60 converts the analog control signals received by the communication ports 45 and 46 to CAN-FD signals and sends the CAN-FD signals to the distributing/aggregating section 51. The signal conversion section 60 corresponds to the signal conversion section 34a of FIG. 2.

The signal conversion section 60 includes a CPU 61, a digital input circuit 62, an analog input circuit 63, and control output circuits 64 and 65. The CPU 61 performs processing of extracting control values related to in-vehicle devices corresponding to the communication ports 47 and 48 from the CAN-FD signals sent from the distributing/aggregating section 51. The extracted control values are sent to the control output circuits 64 and 65. The control output circuit 64 generates an analog control signal, for example, for an LED in accordance with the control value received from the CPU 61 and sends the analog control signal to the communication port 47. The control output circuit 65 generates an analog control signal, for example, for a motor in accordance with the control value received from the CPU 61 and sends the analog control signal to the communication port 48.

The digital input circuit 62 receives, for example, a digital output signal of a switch via the communication port 45, converts the digital output signal to a control value, and outputs the control value to the CPU 61. The analog input circuit 63 receives, for example, an analog output signal of a sensor via the communication port 46, converts the analog output signal to a control value, and outputs the control value to the CPU 61. The CPU 61 incorporates the control values received from the digital input circuit 62 and the analog input circuit 63 in the CAN-FD signals and sends the CAN-FD signals with the control values incorporated therein to the distributing/aggregating section 51.

As illustrated in FIG. 3, the network hub device 30 has a function of transmitting, to the devise side network, a CAN-FD signal received from the trunk network as a CAN-FD signal of the same protocol, a LIN signal of a different protocol converted from the received CAN-FD signal, a CAN signal converted from the received CAN-FD signal, or an analog control signal converted from the received CAN-FD signal. The network hub device 30 has a function of aggregating a CAN-FD signal, a LIN signal, a CAN signal, an analog control signal, or the like received from the device side network into a CAN-FD signal to transmit the CAN-FD signal to the trunk network. However, the network hub device 30 does not have a function of controlling each in-vehicle device. The central processing unit 10 includes a control function of controlling each in-vehicle device, and therefore, the network hub device 30 does not need to include an advanced arithmetic function.

The network hub devices corresponding to the Ethernet hub devices 21 and 22 have a similar function configuration to the above-described one, and detailed description thereof will be omitted.

As described above, according to this embodiment, a network hub device realizes a function of absorbing a difference between control signals, that is, for example, a CAN-FD signal, a CAN signal, a LIN signal, and an analog signal, at an in-vehicle device side, for a trunk network through which a digital control signal, such as a CAN-FD signal or the like, is transmitted. Accordingly, by arranging this network hub device in each zone of a vehicle, an information transmission path from a central processing unit to each in-vehicle device can be formed into a simple network configuration.

At least one of the communication ports 45 to 48 that perform input or output of analog control signals is preferably a universal communication port capable of inputting or outputting an analog control signal to or from a plurality of types of in-vehicle devices. Thus, versatility of the network hub device can be enhanced. For example, the analog input circuit 63 in the signal conversion section 60 may employ a circuit configuration that can process outputs of a plurality of types of sensors, and thus, the communication port 46 can function as a universal communication port.

First One of Other Examples

Figure 4:
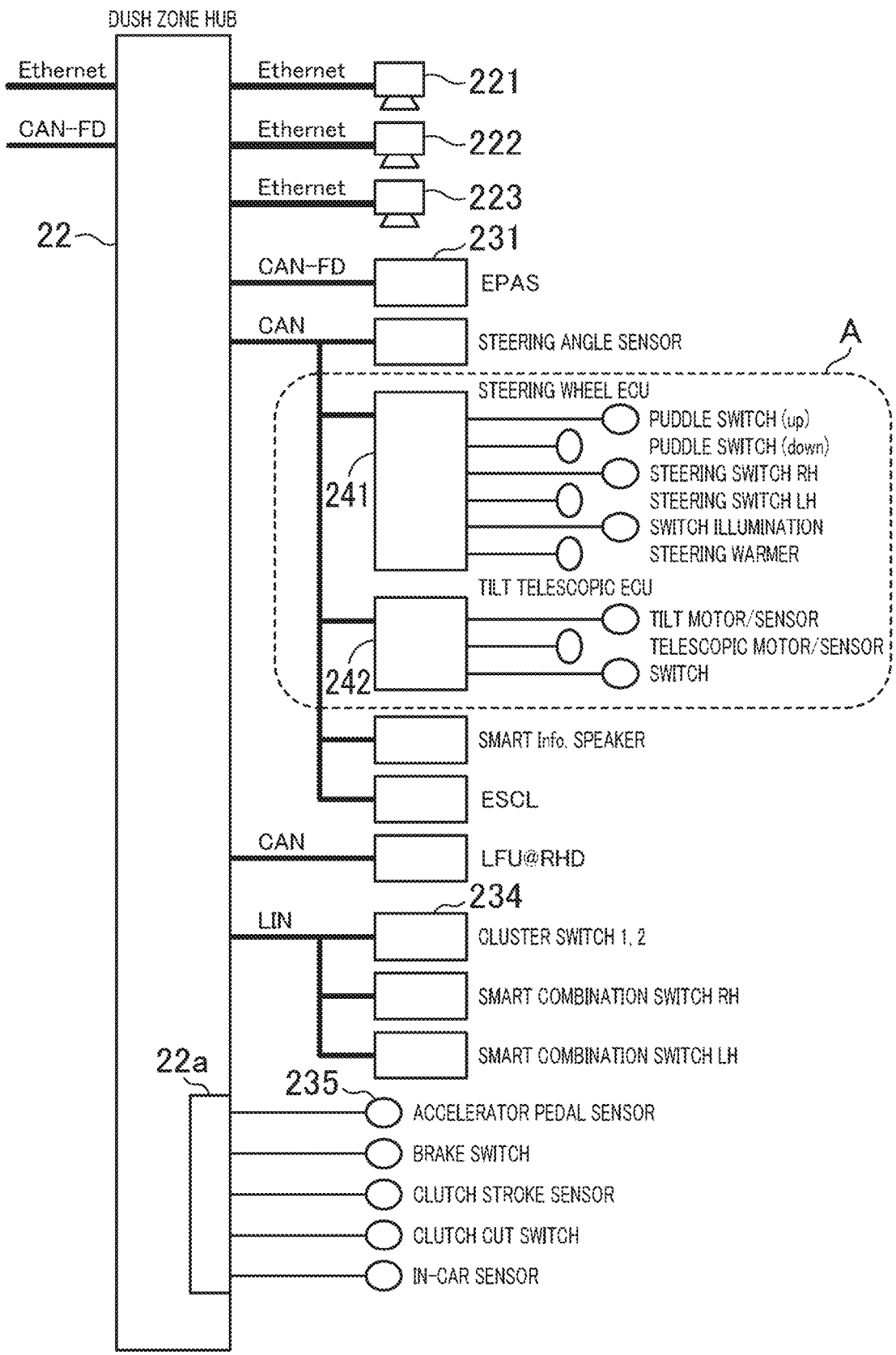
FIG. 4 is a diagram illustrating another example of the input/output configuration of the network hub device.

FIG. 4 illustrates, as another example of an input/output configuration of the network hub device, an input/output configuration of the Ethernet hub device 22 arranged in the dash zone. Note that a steering wheel ECU 241 and a tilt telescopic ECU 242 that will be described later are examples of a sub hub device.

As illustrated in FIG. 4, specifically, for example, the Ethernet hub device 22 transmits an image signal included in transmitted Ethernet signals to each of electronic mirror devices 221 and 222 and a display device 223 to cause each of the devices to display an image. The Ethernet hub device 22 protocol-converts some of control signals included in the transmitted Ethernet signals to CAN-FD signals and transmits the CAN-FD signals to the CAN hub devices 34 and 36.

The Ethernet hub device 22 protocol-converts a control signal included in the transmitted Ethernet signals to a CAN-FD signal and outputs the CAN-FD signal to an electric power assist steering (EPAS) 231 or the like. EPAS 231 includes a CAN controller built therein, extracts control data from the transmitted CAN-FD signal, and executes control of EPAS.

The Ethernet hub device 22 protocol-converts a control signal included in the transmitted Ethernet signals to a CAN signal and outputs the CAN signal to the steering wheel ECU 241 and the tilt telescopic ECU 242 or the like. The Ethernet hub device 22 protocol-converts the CAN signals transmitted from the steering wheel ECU 241 and the tilt telescopic ECU 242 or the like to Ethernet signals and transmits the Ethernet signals to the trunk network.

The steering wheel ECU 241 includes a CAN controller and an analog input/output circuit built therein, receives an output of a switch or a sensor provided on the steering wheel, converts the output to a CAN signal, and transmits the CAN signal to the Ethernet hub device 22. The steering wheel ECU 241 extracts control data from the CAN signal transmitted from the Ethernet hub device 22, converts the control data to an analog control signal, and executes control of an illumination, a warmer, or the like provided on the steering wheel. The tilt telescopic ECU 242 includes a CAN controller and an analog input/output circuit built therein, receives an output of the switch or the sensor provided on the steering wheel, converts the output to a CAN signal, and transmits the CAN signal to the Ethernet hub device 22. The tilt telescopic ECU 242 extracts control data from the CAN signal transmitted from the Ethernet hub device 22, converts the control data to an analog control signal, and executes control of a tilt motor, a telescope motor, or the like.

The Ethernet hub device 22 protocol-converts a LIN signal transmitted from a cluster switch 234 or the like to an Ethernet signal and transmits the Ethernet signal to the trunk network. The Ethernet hub device 22 includes a signal conversion section 22*a*. The signal conversion section 22*a* protocol-converts an analog output signal output from an accelerator pedal sensor 235 or the like to an Ethernet signal. The protocol-converted Ethernet signal is transmitted to the trunk network.

In this case, in order to couple an in-vehicle device provided on the steering wheel, such as the sensor, the switch, the illumination, or the like, to the trunk network, a signal line needs to be provided via a clock spring. Therefore, a harness diameter is physically limited, and therefore, if too many signal lines are provided, it is difficult to couple the in-vehicle device to the trunk network, and workability in assembling the steering wheel to a vehicle body is reduced.

Therefore, in this example, each of components surrounded by the broken line A in FIG. 4 (in FIG. 1, a corresponding portion is surrounded by the broken line A) performs communication with the Ethernet hub device 22 using a CAN signal. That is, the steering wheel ECU 241 and the tilt telescopic ECU 242 that control in-vehicle devices provided onto the steering wheel are provided in a steering wheel side. The steering wheel ECU 241 and the tilt telescopic ECU 242 transmit/receive digital control signals to/from the Ethernet hub device 22 via a wire harness passing through the clock spring. Thus, the signal line provided via the clock spring is only a cable for the CAN signal, and therefore, a configuration of the in-vehicle network is simplified and workability in assembling the steering wheel is increased.

Note that the steering wheel is an example of a partial body assembled to the vehicle body and the clock spring is an example of a movable portion between the vehicle body and the partial body. The sub hub device illustrated as an example may be provided in another partial body, such as, for example, a seat, a mirror, a door, or the like, assembled to the vehicle body via the movable portion.

Second One of Other Example

Figure 5:
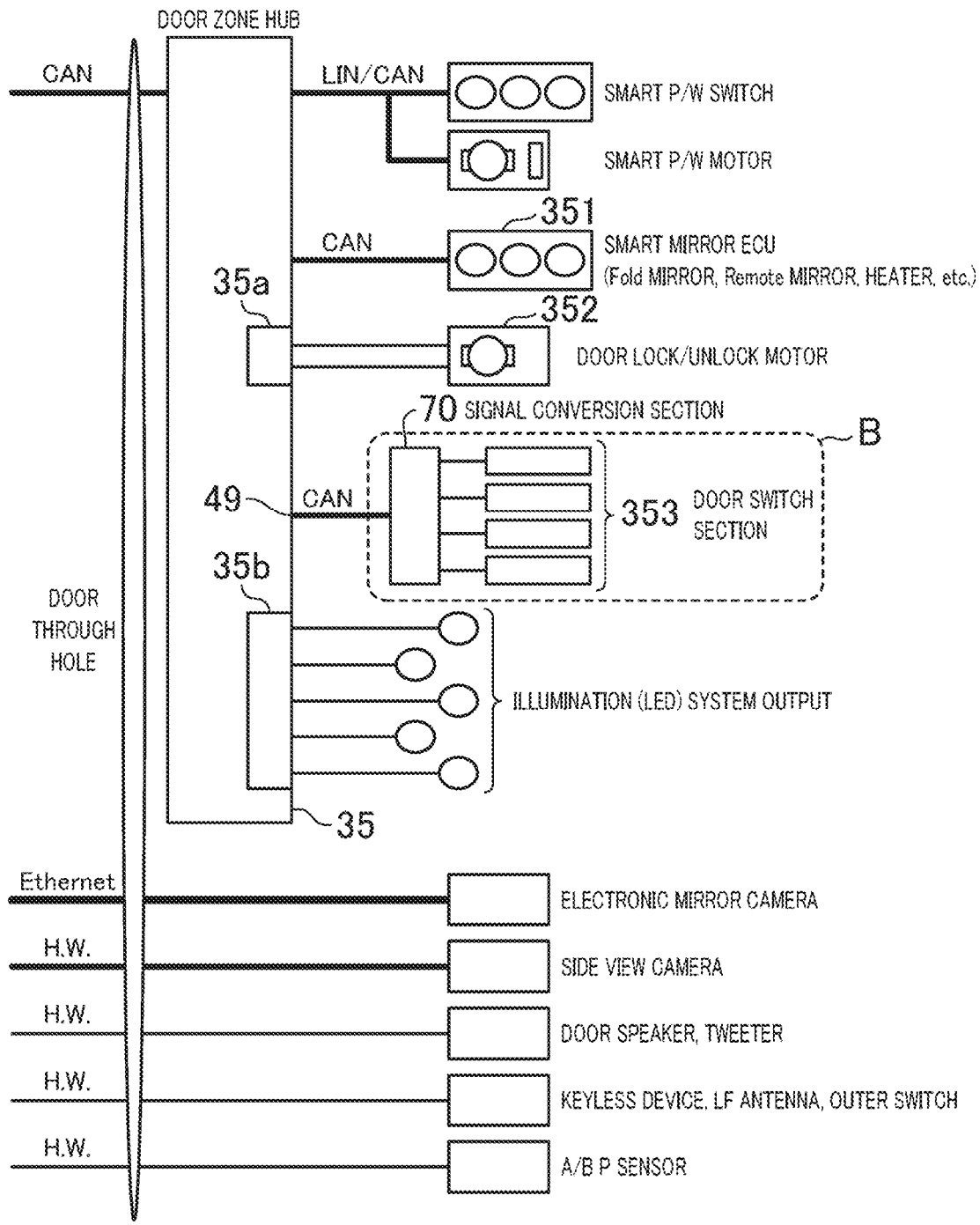
FIG. 5 is a diagram illustrating still another example of the input/output configuration of the network hub device.

FIG. 5 illustrates, as another example of the input/output configuration of the network hub device, an input/output configuration of the CAN hub device 35 provided in a door zone. The CAN hub device 35 is provided in a side door (for example, a right side door 2R or a left side door 2L in FIG. 1). As illustrated in FIG. 5, specifically, for example, the CAN hub device 35 outputs a control signal included in CAN signals transmitted from the trunk network as it is to a smart mirror ECU 351 or the like. The smart mirror ECU 351 includes a CAN controller built therein, extracts control data from the transmitted CAN signal, and executes control of a mirror. The CAN hub device 35 includes signal conversion sections 35*a* and 35*b*. The signal conversion sections 35*a* and 35*b* convert the control signals included in the CAN signals transmitted to the CAN hub device 35 from the trunk network to analog control signals and output the analog control signals to a door lock/unlock motor 352 or the like.

The CAN hub device 35 includes a communication port 49 that inputs/outputs a CAN signal as a device side communication port. The communication port 49 corresponds to the first digital port. A signal conversion section 70 configured to perform signal conversion between a CAN signal and an analog control signal is provided between the communication port 49 and in-vehicle devices. In this case, the signal conversion section 70 is coupled to a door switch section 353 with switches related to a door arranged therein. Herein, the switches related to the door are, for example, a centralized door lock switch provided on an arm rest of a driver's seat door, a lock link switch operated by a lock knob operation performed by an occupant and configured to determine door lock/unlock, a door switch arranged in a latch mechanism of a door and configured to detect a door open/close state, or the like. As described above, by providing the signal conversion section 70 coupled to the communication port 49 that inputs/outputs a CAN signal separately from the signal conversion sections 35*a* and 35*b*, components surrounded by the broken line B in FIG. 5 (in FIG. 1, a corresponding portion is indicated by the broken line B) can be arranged close to one another. Thus, a hard wire between the signal conversion section 70 and the door switch section 353 can be reduced in length or omitted. Note that the switches provided in the door switch section 353 are examples of the in-vehicle devices.

The signal conversion section 70 may be configured with a circuit substrate of the door switch section 353 as one unit. Thus, the hard wire between the signal conversion section 70 and the door switch section 353 can be omitted.

The above-described embodiment is a mere example, and the scope of the present disclosure should not be restrictively interpreted. The scope of the present disclosure is defined by the appended claims, and all modifications and changes within an equivalent scope of the claims fall within the scope of the present disclosure.

INDUSTRIAL APPLICABILITY

The technology disclosed herein is useful for building an in-vehicle network system having a simple configuration.

DESCRIPTION OF REFERENCE CHARACTERS

1 Vehicle
2R, 2L Side door
10 Central processing unit
21, 22 Ethernet hub device (network hub device)
22*a* Signal conversion section
30 Network hub device
31 to 37 CAN hub device (network hub device)
34*a*, 35*a*, 35*b* Signal conversion section
41 Trunk side communication port
42 to 49 Device side communication port
52 Protocol conversion section 60 Signal conversion section
70 Signal conversion section (second signal conversion section)
353 Door switch section

The invention claimed is:

1. A network hub device used in an in-vehicle network system, comprising:
- a trunk side communication port configured to couple to a trunk network through which a digital control signal of a predetermined first protocol is transmitted, the trunk network coupled to a central processing unit provided in the in-vehicle network system;
- a plurality of device side communication ports serving as communication ports each configured to perform input/output of a signal to/from an in-vehicle device and including a first digital port configured to input/output the digital control signal and a first analog port configured to input/output an analog control signal; and
- first signal conversion circuitry provided between the trunk side communication port and the first analog port and configured to perform signal conversion between the digital control signal of the first protocol and the analog control signal input/output by the first analog port; and
- second signal conversion circuitry provided between the first digital port and the in-vehicle device and configured to perform signal conversion between the digital control signal input/output by the first digital port and the analog control signal input/output by the predetermined in-vehicle device.

2. The network hub device of claim 1, wherein
the second signal conversion circuitry is formed as one unit with a circuit substrate of the in-vehicle device.

3. The network hub device of claim 1, wherein
the predetermined in-vehicle device includes at least one switch that controls an operation related to a door, and
the network hub device is provided in a side door.

4. The network hub device of claim 2, wherein
the predetermined in-vehicle device is switches related to a door, and
the network hub device is provided in a side door.

* * * * *